Aug. 30, 1938.    M. L. BURKE ET AL    2,128,690
PNEUMATICALLY OPERATED EDUCATIONAL GAME
Filed March 23, 1935    5 Sheets-Sheet 1

Inventors
M. L. Burke
R. J. Burke
by Stuart M. Maule
Attorney.

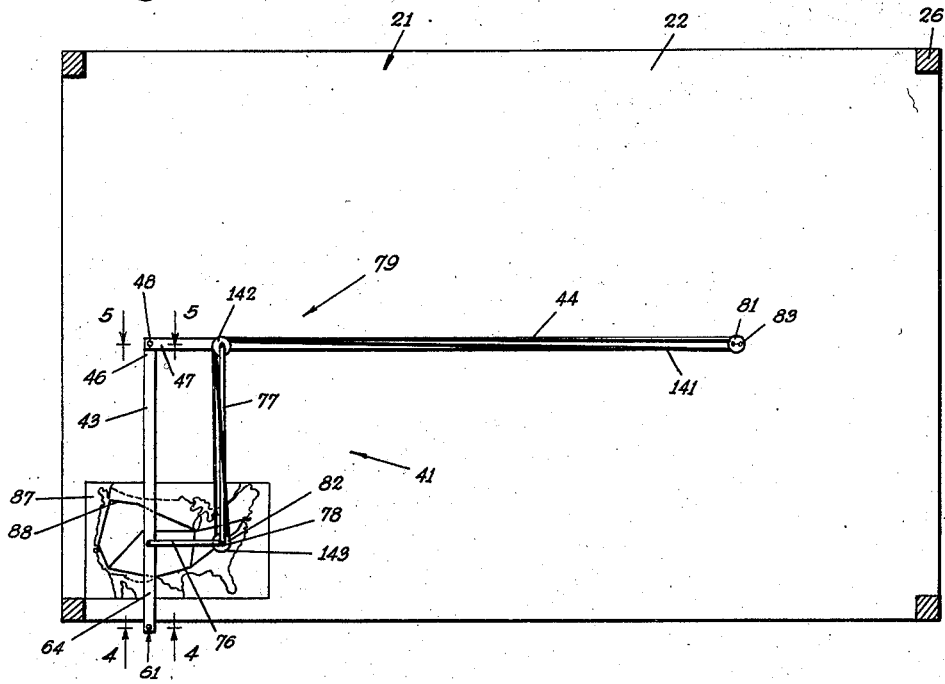

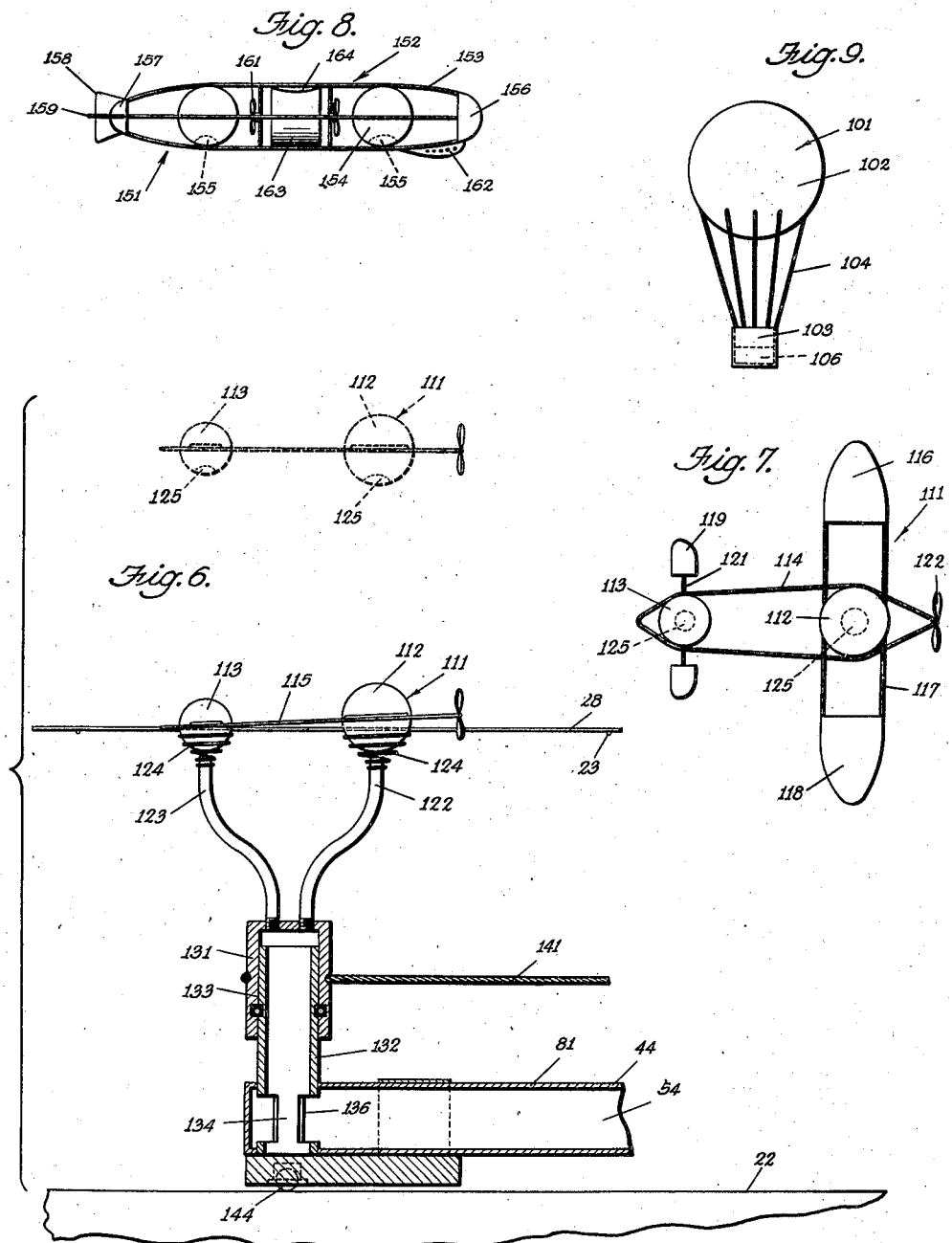

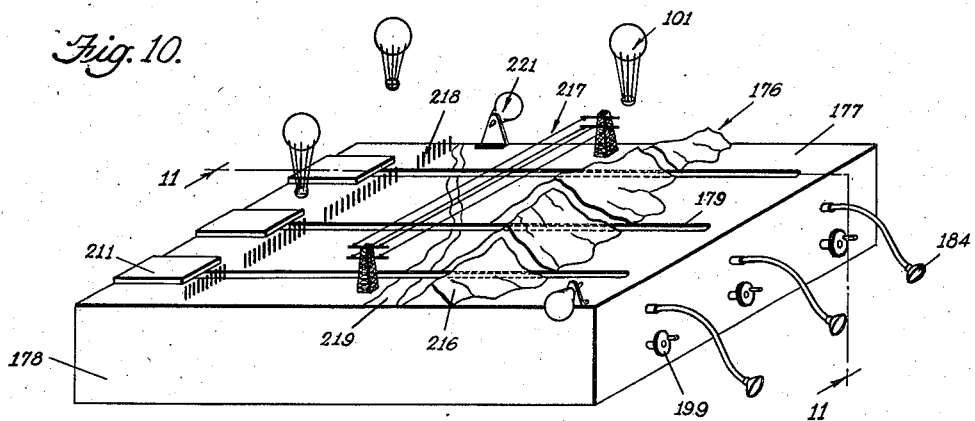
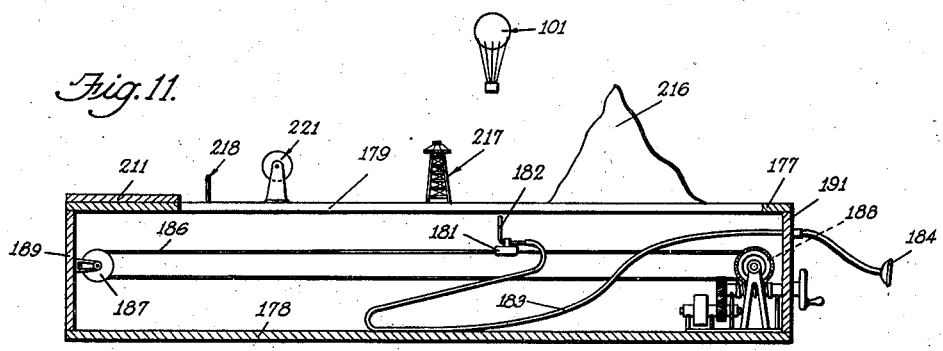
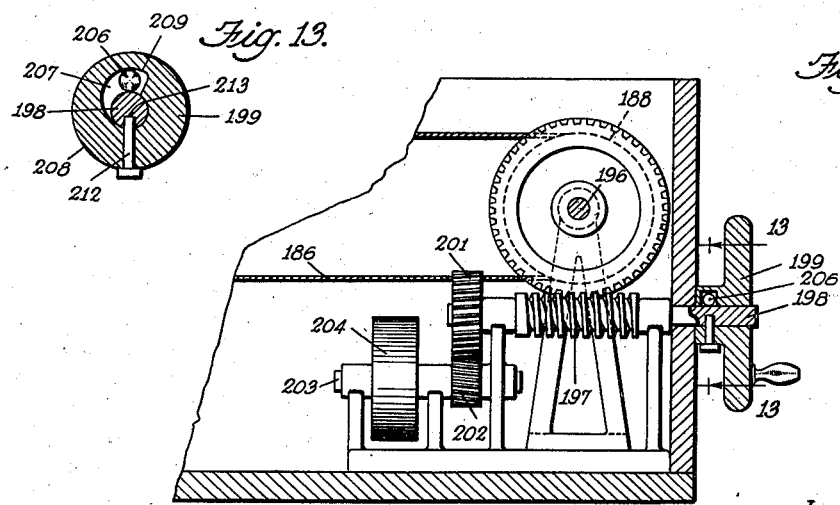

Aug. 30, 1938.  M. L. BURKE ET AL  2,128,690
PNEUMATICALLY OPERATED EDUCATIONAL GAME
Filed March 23, 1935  5 Sheets-Sheet 5
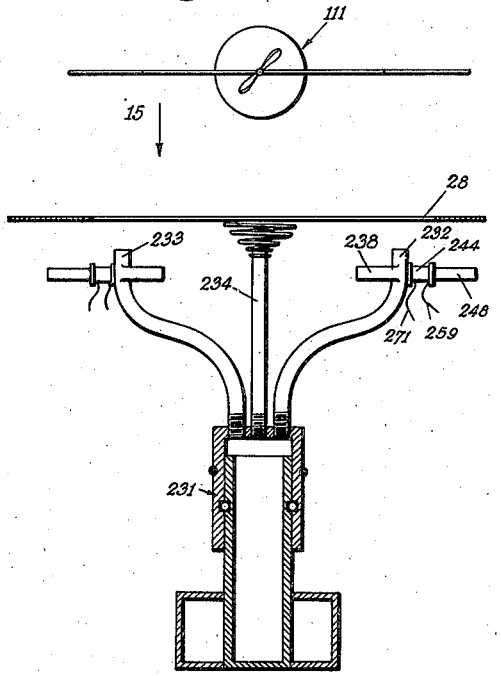
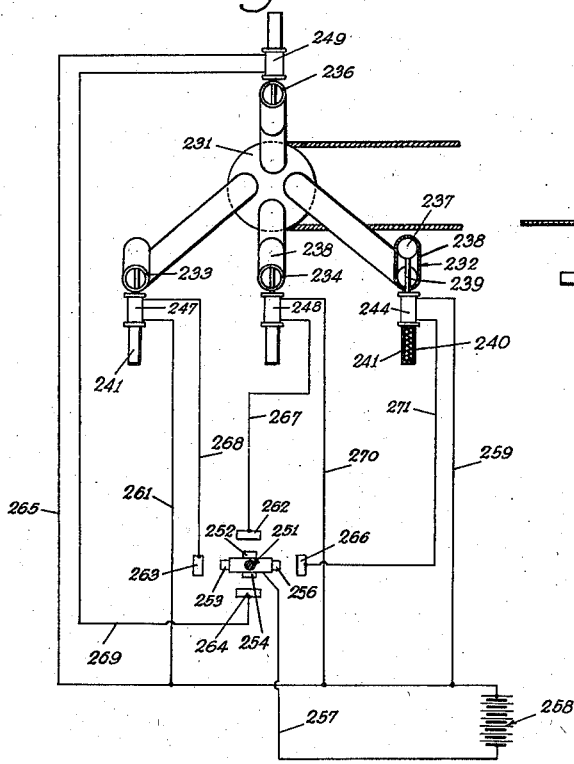
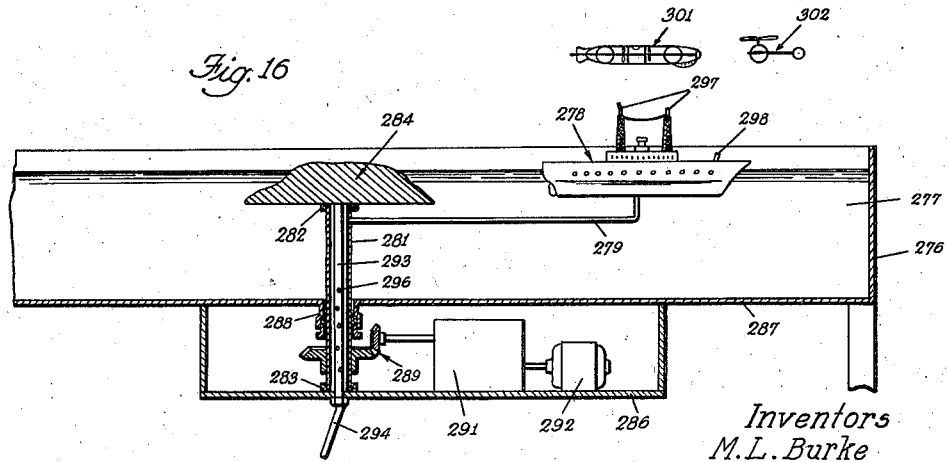
Inventors
M. L. Burke
R. J. Burke
by Stuart M. Maule
Attorney.

Patented Aug. 30, 1938

2,128,690

UNITED STATES PATENT OFFICE 2,128,690

PNEUMATICALLY OPERATED EDUCATIONAL GAME

Minnie L. Burke and Richard J. Burke, Altadena, Calif.

Application March 23, 1935, Serial No. 12,600

19 Claims. (Cl. 35—40)

Our invention relates to games, and to educational, display and scientific devices.

An object of our invention is to provide a device wherein a model aircraft is caused to move over a suitable operating surface, such as a map or other representation of a selected terrain, in close simulation of the flight of an actual aircraft.

Another object is to provide a device of the character indicated, wherein the model aircraft is supported and moved about by means invisible to an observer, whereby to enhance the reality of the illusion created by the model, simulating the flight of an actual aircraft.

A more detailed object in this connection is to provide a device of the character described wherein the model aircraft is supported and moved about by one or more jets issuing from a nozzle or nozzles movably disposed and concealed below the map or other surface over which the model aircraft flies, it being understood that suitably arranged apertures are provided in that surface through which the jets are directed.

It is a further object to provide means operable from a point remote from the model aircraft for moving the nozzle or nozzles, as the case might be, whereby the model aircraft can be caused to follow a predetermined path with respect to certain points represented upon the map.

Still another object is to provide means for controlling the direction toward which the model aircraft is pointed with respect to the points of the compass as represented upon the map, and also the position of the model aircraft with respect to the horizontal, whereby the effects of steering, banking, nosing up and down, and other movements of actual flying can be imitated in the movements of the model aircraft.

A further object is to provide controlling means of the character indicated which are adapted to be operated by a manually operable lever pivoted at its lower end and movable to operate the principal controls of the model aircraft in close simulation of the manner in which the controls of an actual aircraft are operated by the "joy stick" thereof.

It is a further object of our invention to provide interchangeable maps and means for mounting a selected map over which the model aircraft can be flown, whereby a person is enabled to receive instruction regarding the air routes traversed by actual aircraft in regularly scheduled flights, and the like.

It is another object to provide hazards over, around, and/or through which the model aircraft can be flown, such as miniature mountains, power lines, fences, lakes, and the like. These miniature hazards can be simulations of the real hazards likely to be encountered by an actual aircraft in flying the course represented upon a given map, whereby valuable instruction can be imparted to a student pilot regarding the character of the territory over which he might later be required to maneuver an airplane.

A still further object of the present invention is to introduce the element of competition into the manipulation of the device, either by indicating certain points, such as distantly spaced airports, between which a model aircraft is to be flown in a minimum of time, or by duplicating courses to be traversed in a single device, and providing a model aircraft and operating means therefor associated with each of the courses, whereby more than one person can operate the device simultaneously, the object being for each operator to complete the flight of his "ship" over the prescribed course before any of his competitors.

Among the general objects of our invention is that of providing a device of the general character indicated which is adapted to develop the skill of an operator in maneuvering his aircraft with an increasing degree of efficiency, and yet which is capable of being operated with such measure of success with only a minimum of skill that it will be of real value as a game or educational device to be played or operated by relatively young and/or unskilled persons.

Another important object is to provide a construction whereby we can secure the foregoing and other advantages by the use of a minimum number of parts, and which is simple in design, inexpensive to manufacture and assemble, and positive and relatively simple in operation.

The invention possesses other objects and advantageous features, some of which, with the foregoing, will be set forth in the following description of the preferred forms of our invention which are illustrated in the drawings accompanying and forming a portion of the specification. It is to be understood that we do not limit ourselves to the showing made by the said drawings and description, as we may adopt variations of the preferred forms within the scope of our invention as set forth in the claims.

Referring to the drawings:

Figure 3 is an enlarged, horizontal sectional view, the plane of section being indicated by the line 3—3 of Fig. 1.

Figure 4 is an enlarged, detail view illustrating the manner of connecting the source of fluid supply to the device. This view may be considered a vertical sectional view taken upon the line 4—4 of Fig. 3 with the direction of view as indicated by the arrows.

Figure 5 is an enlarged detail view which may be considered a vertical section taken upon the line 5—5 of Fig. 3 with the direction of view as indicated by the arrows.

Figure 6 is an enlarged detail view in vertical, medial section taken through the movable head which carries the jet-forming nozzles, and showing the manner wherein a model aircraft is supported by the jets. The position of the model aircraft in flight is indicated in broken lines.

Figure 7 is a top plan view of the type of model aircraft illustrated in Fig. 6.

Figure 8 is a view in side elevation showing a modified type of model aircraft.

Figure 9 is a view in side elevation showing a still further modified type of model aircraft best suited for but not limited to, use in conjunction with the modification of our invention illustrated in Figures 10 to 13 inclusive.

Figure 10 is a view similar to Figure 1 but showing a modified form of device embodying the principles of the present invention.

Figure 11 is a longitudinal, vertical sectional view, the plane of section being indicated by the line 11—11 of Fig. 10 with the direction of view as indicated.

Figure 12 is an enlarged detail view of the mechanism for advancing the nozzle-carrying head in the modification illustrated in Figures 10 and 11.

Figure 13 is a more highly enlarged detail view in vertical section taken upon the line 13—13 of Fig. 12.

Figure 14 is a view similar to Fig. 6 but showing a modified form of nozzle-carrying head, the nozzles of which are provided with means for controlling the flow of fluid therethrough.

Figure 15 is a plan view taken in the direction of the arrow 15 of Fig. 14 and showing diagrammatically the electrical circuits associated with the flow-controlling means of Fig. 14.

Figure 16 is a transverse, vertical sectional view illustrating a still further modified form of device embodying the principles of our present invention.

In terms of broad inclusion, the present invention contemplates the provision of a device wherein a body representing and identified as a miniature model of an aircraft is supported in mid-air through the expedient of one or more jets of fluid, preferably invisible so as to create the illusion of actual flight of the model aircraft.

This inventive concept has received a variety of expressions, one of which is illustrated upon Figures 1 to 8, inclusive. The device here illustrated is adapted for use as a game or as an educational, display, or scientific device. It comprises a housing 21 which includes a bottom 22 having disposed thereabove a supporting member, preferably in the form of a grill or spaced wires 23 stretched upon a suitable frame 24. Legs 26, preferably at the corners of the housing 21, support the wire-holding frame 24 at suitable elevation above and substantially parallel to the bottom 22 of the housing 21.

Figure 1:
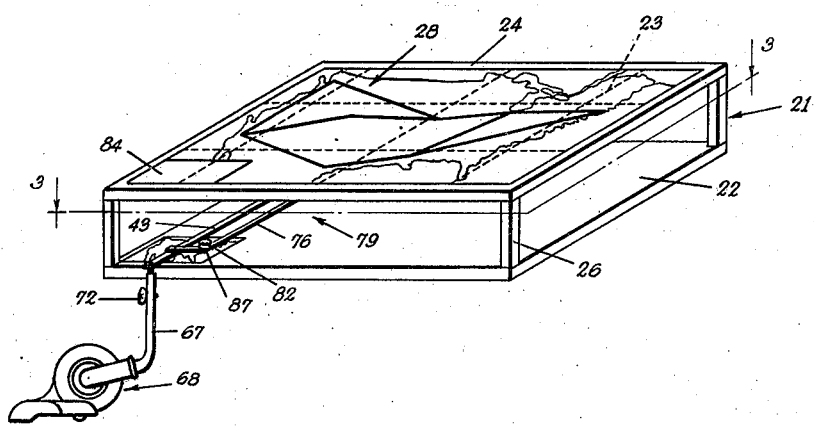
Figure 1 is a perspective view illustrating a device embodying the principles of the present invention. The source of fluid supply is illustrated diagrammatically.
Figure 2:
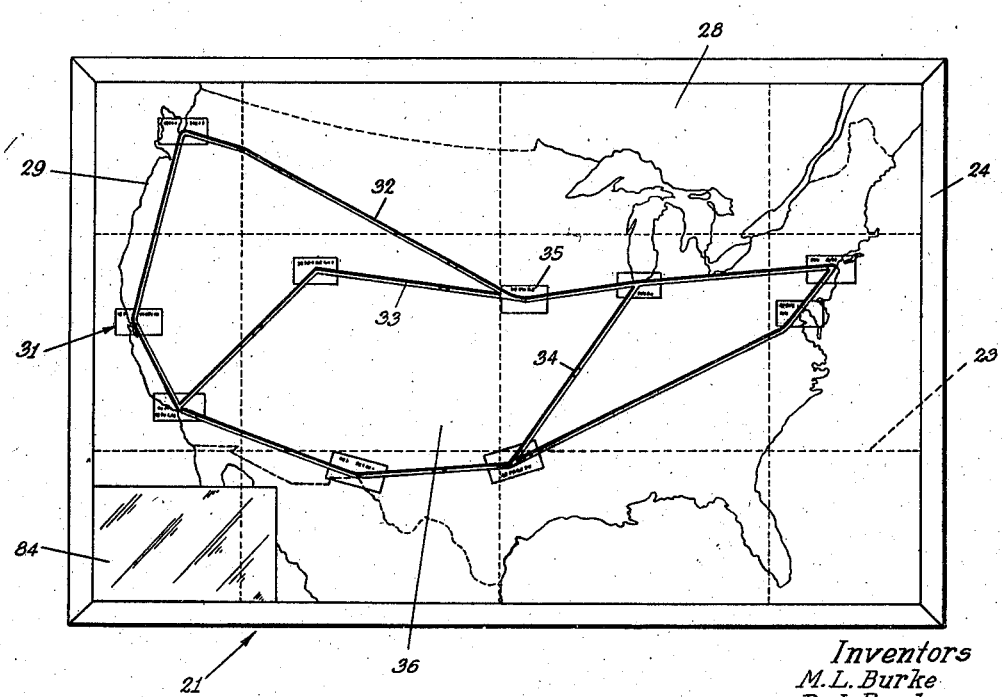
Figure 2 is an enlarged top plan view of the device illustrated in Fig. 1.

The supporting member is adapted to receive and releasably retain a map 28, the outside dimensions of which preferably are such that it fits nicely within the frame 24, so as to be supported by the spaced wires 23 at suitable elevation above the bottom 22. This map preferably is one of a plurality, any one of which can be selected at will and placed in operable position, as hereinabove indicated. Each map 28 depicts a predetermined terrain—for example, that illustrated on Fig. 2 is a map of the United States, having imprinted thereon the outline 29 of the United States, with various important cities 31, such as New York, Washington, and Los Angeles, indicated in appropriate locations. Marked upon each map are certain routes 32 interconnecting certain of the cities which are indicated thereon, and surrounding all or selected ones of the cities areas 35 of predetermined size which are intended to represent airports for the respective cities. Thus it may be seen that each of the maps 28 is in reality a chart indicating conventional air routes between important cities, and it is preferred that the maps be made relatively accurate; i. e., with their respective air routes substantially corresponding to those regularly traversed by actual mail and passenger airplanes following regular schedules, the purpose being to make the device educational so that persons employing it can receive valuable instruction, not only in the geography of the terrain represented by each map, but also concerning the regularly followed routes of air travel between important points in that terrain.

Each of the air routes thus indicated has associated therewith a suitable aperture or apertures 33, through which a jet of air or other suitable fluid can be directed from a nozzle disposed underneath the map 28. Preferably these apertures 33 are in the form of elongated slots substantially continuous throughout the length of each air route 32. However, under certain circumstances, webs 34 must be provided extending across the apertures 33 so as to support a portion 36 of the map which is completely surrounded, or in some instances only partially surrounded, by slots 33. These webs, however, are preferably relatively narrow so as to interfere as little as possible with the flow of fluid issuing from a nozzle moving along a slot 33 with its jet directed upwards through that slot.

Whereas various types of operating mechanism may be employed for carrying a nozzle below and in proper operative relation to the map 28, Figure 3 illustrates one type which has proven satisfactory. This operating mechanism 41 comprises elongated tubular arms 43 and 44 pivotally joined at their ends 46 and 47, respectively, by a tubular pintle 48 (see Fig. 5) extending vertically through both tubular arms 43 and 44, and having apertures 51 and 52, through the expedient of which communication is at all times maintained between the bores 53 and 54 of the tubes 43 and 44, respectively. The ends 56 of the tube 48 are closed, and a suitably tight fit is established between each arm 43, 44, and the pintle 48, to prevent the escape of any material quantity of fluid therebetween. In this manner, the tubular arms 43 and 44 are pivotally joined and have their respective bores 53 and 54 at all times interconnected for the free passaage of fluid from the tube 43 to the tube 44.

Operating fluid, preferably air at suitable pressure, is supplied to the arm 43 through the expedient of another tubular pintle 61, the lower end 62 of which is rigidly mounted at an edge of the operating surface 22 and preferably adjacent one corner thereof. The upper end 63 of the tubular pintle 61 has rotatably mounted thereon the end 64 of the arm 43 opposite that end 46 which is connected to the arm 44. This upper end 63 of the tube 61 is also provided with suitable openings 66, establishing communication between bore of the tube 61 and the bore 53 of the tube 43. A preferably flexible tube 67 leads from the lower end of the tubular pintle 61 to a suitable source of air pressure, such as a conventional, household, vacuum cleaner 68, which is illustrated diagrammatically in Fig. 1.

A throttle valve 71 and manually operable handle 72 therefor, for controlling the rate of flow from the source 68 to the tube 43, are provided in convenient location, preferably in the lower end of the tubular pintle 61.

Auxiliary arms 76 and 77 are pivoted together as at 78, and also to the arms 43 and 44 in such position that the arms 76 and 77 are at all times parallel to the arms 44 and 43, respectively. Thus it may be seen that the four arms 43, 44, 76, and 77 are assembled in a pantograph construction 79, the point of anchorage of which is the pintle 61. By means of this pantograph construction 79, the outer end 81 of the arm 44 may be caused to follow a selected path by moving an operating handle 82, which is revolubly mounted at the pivotal connection 78 between the auxiliary arms 76 and 77, in a similar proportionate path, but according to a reduced scale. Consequently, a nozzle carried by the outer end 81 of the arm 44 may be caused to move along one of the slots 33 associated with one of the air routes 32 of the map 28, by moving the operating handle 82 in the corresponding direction in a parallel path, but through a shorter distance. Such being the case, in some instances it may be preferable to provide each of the maps 28 with a transparent area 84 through which may be observed a removably mounted key map 87 appropriate to the selected map 28, and also the operating handle 82 of the pantograph 79. This key map 87 may have delineated thereupon, at the appropriate reduced scale, air routes 88 corresponding to the air routes 32 of the map 28 intended to be used in conjunction therewith. By this means an operator can, by moving the operating handle 82 along the air routes 88 of the key map, cause the nozzle to move along the operating surface 22 under the slots 33 of the air routes 32 of the map 28.

It should be understood, however, that the device can be operated satisfactorily without the use of the key map 87, because the operator can watch the course of the nozzle 83 or the course followed by a model aircraft supported in the jet issuing therefrom, and move the operating handle 82 appropriately to cause the nozzle 83 to move in the proper direction as determined by the slot 33 over which the aircraft is flying.

Figure 9 illustrates one type of model aircraft 101 in the form of a miniature replica of a balloon adapted for use in conjunction with the device described hereinabove. The body portion of this model balloon is in the form of a sphere 102 which is a simulation of the conventional gas bag ordinarily used by a well known type of lighter than air aircraft. Depending from the sphere 102 is a small cup- or basket-shaped member 103, which is supported by preferably a plurality of fine wires 104 or their equivalent, representing the basket-supported shrouds of a conventional balloon. Preferably the basket 103 is weighted by being composed of relatively heavy material, or by being partially filled with suitable weighting material, such as a small quantity of mercury 106. The sphere 102, however, is of relatively light construction, being hollow and very thin.

This type of model aircraft is best suited for use in conjunction with a single nozzle, inasmuch as it can be supported and moved about by a single, upwardly directed jet of fluid, in such a manner as to simulate closely the flight of an actual, full sized balloon. Thus it may be understood that if such nozzle is carried by the end 81 of the pantograph arm 84, below the map 28 with the jet issuing from that nozzle upwardly through a slot 33, the model balloon 101 will be supported in mid-air by that jet, thereby presenting the illusion of a balloon flying over the terrain depicted or represented upon the map 28. Moreover, progress of the balloon from one place to another, or between "airports" 35, can be effected by movement of the nozzle in whose jet the balloon 101 is supported, in such a manner that the jet from that nozzle issuing through the slot 33 moves along from the starting "airport" 35 to the "airport" 35 where the "flight" is to end.

Figures 6 and 7 illustrate a modified type of model aircraft equally well and perhaps better adapted for use in conjunction with the apparatus hereinabove described in connection with Figures 1 to 5 inclusive. This model which is indicated in its entirety at 111 is a simulation in miniature of an airplane of the monoplane type. The body portion of the model airplane 111 is in the form of a sphere 112, preferably similar in construction to the ball 102 of the modification previously described. This ball 112 represents the fusilage of an actual aircraft, whereas the empennage is represented by a second and preferably smaller ball 113. These balls 112 and 113 are retained in spaced relation by preferably a plurality of wires 114 or the like, which serve as longerons and which cooperate with the balls 112 and 113 in presenting a structure which has a certain degree of similarity of appearance to the body portion of an actual airplane. Extending laterally from the larger ball 112 are wings 116, preferably in the form of wire frames 117, with suitable webbing 118 carried thereby. Preferably, however, the webbing 118 is disposed only at the outer end of each frame 117, so that the jet which engages the ball 112 in supporting the model 111 will suffer little or no impingement against the webbing 118 carried by either wing 116. We prefer also to provide smaller wings 119 extending laterally from the smaller, after ball 113. These wings 119 represent the elevators of the actual aircraft of which the model 111 is a simulation. Here again, however, the wings 119 are spaced laterally outwards from the ball 113 by their supporting wires 121, far enough to clear the jet impinging against the ball 113. To enhance the accuracy of simulation of an actual aircraft, preferably one or more propellers 122 are revolubly mounted at the front end of the model 111.

Preferably a small quantity of mercury 125 or other weighting matter is disposed within each of the spheres 112 and 113, resulting in lowering the center of gravity of each sphere to a point close to the bottom wall thereof. This has been found to add very materially to the stability of the model airplane 111, causing it to remain much more nearly motionless within the upwardly directed fluid jets than when the weighting matter is omitted. The same principle may be applied to the model balloon 101, but it has been found that in most instances the weight 106 in the basket 103 serves the same purpose.

This type of model 111 flies more efficiently when used in conjunction with a nozzle 122, 123 for each of the balls 112, 113, respectively. The spacing between the nozzles 122 and 123 is substantially the same as that between balls 112 and 113; and each nozzle is provided at its upper end with a suitable basket structure 124 adapted to support the associated ball 112, 113 and retain it in axial alignment with the associated nozzle when the model 111 is at rest, i. e., when the supply of fluid to the nozzles has been cut off and the model 111 has thus been lowered to the position indicated in full lines upon Figure 6.

Both nozzles 122 and 123 are carried by a head 131 which is mounted for free rotary motion upon a tubular spindle 132 which extends upwards from the outer end 81 of the arm 44 of the pantograph 79. Thus it may be seen that when a model aircraft having a plurality of spheres is used, a corresponding number of the nozzles 122 and 123 are substituted for the single nozzle 83, whereby the model 101 having the single ball 102, is supported.

The upper end 133 of the tubular spindle 132 opens into the interior of the nozzle-carrying head 131; and the lower end 134 of the spindle 132 extends into the bore 54 of the tubular arm 44, where it is provided with suitable openings 136 whereby fluid is enabled to flow from the bore 54 to the interior of the tube 132 and thence by way of the head 131 to both nozzles 122 and 123.

Inasmuch as the spacing between the nozzles 122 and 123 is preferably greater than the width of any of the slots in the map 28, the most efficient operation of the device requires that the head 131 be kept turned so that the plane including the axes of the nozzles 122 and 123 is disposed substantially parallel to that slot. Otherwise, one or both of the jets issuing from the nozzles 122, 123 will be interrupted and support of the model 111 thereby made more difficult or impossible. The means for enabling the operator to keep the nozzles 122 and 123 parallel to the slot along which the model 111 is being advanced, comprises a cord 141 or its equivalent, engaged upon and extending around the rotary head 131. Both runs of the cord 141 extend along the arm 44 (see Fig. 3) to a pulley arrangement 142, the axis of which preferably coincides with the axis of the pivotal connection between the arms 44 and 77, whence both runs extend to the operating handle 82 at the pivotal connection 78 between the arms 76 and 77. Thus it may be seen that the handle 82 serves the double function of enabling the operator to move the entire pantograph in such a manner that the nozzle-bearing head follows the desired course, and also by rotating the handle 82, producing corresponding rotation of the rotary head 131 to keep the nozzles 122 and 123 in a plane parallel to the slot 33 being used. This rotation of the head 131 affects similar rotation of the model 111 supported by the jets from the nozzles so that in effect, rotation of the operating handle 82 steers the model 111 correspondingly. In order to facilitate movement of the outer end 81 of the pantograph over the operating surface 22 an antifriction bearing 144 is preferably mounted on the under side of the outer end of the arm 44 and/or at any other portion of the pantograph which is found to bear upon the supported surface 22 with sufficient pressure to interfere with free movement thereof.

Figure 8 illustrates another modified form of a model aircraft 151, which in this instance is a simulation of a dirigible. The body portion 152 of the model 151 is defined by a wire framework 153 rigidly interconnecting a pair of spaced balls 154, preferably similar in construction to the ball 101 and each preferably having a weight, such as a small quantity of mercury 155 thereinside. Nose and tail caps 156 and 157, respectively, at the ends of the framework 153, steering and elevating rudders 158 and 159 respectively, and miniature propellers 151, preferably at the sides of the body portion 152, enhance the exactitude of simulation of an actual dirigible, as does also a miniature cabin 162 disposed on the under side of the model 151, adjacent the nose 156. However, in order that maximum efficiency of "flight" be assured, we prefer that these ornamental features be spaced far enough from the balls 154 to clear the jets in which they are supported. In the center of the body 153 is preferably a drum 163 having an opening 164 at the top thereof. This provides a cargo-carrying space in which small objects representing sacks of mail/or other articles can be carried while the model 151 is in flight.

By the use of the apparatus hereinabove described, both entertainment and education can be derived. By actuation of the source of fluid, such as the conventional vacuum cleaner indicated diagrammatically on Figure 1, fluid at suitable pressure can be supplied to the nozzles 122 and 123. Then by manipulation of the operating handle 82, these nozzles 122 and 123 can be moved about over the operating surface 22 so as to bring them under a selected one of the apertures 33. By turning the operating handle 82 about its own vertical axis, the head 131 carrying the nozzles 122 and 123 can be similarly rotated whereby to bring both nozzles into alignment with the selected slot or aperture 33. The jets issuing from the nozzles 122 and 123 will then flow upwardly through the slot 33 with little or no interference to their smooth flow by the map 28. Accordingly, one of the model aircraft hereinabove described can be supported in these jets. If a nozzle-carrying head having a single nozzle thereon is employed, preferably the model balloon 101 illustrated on Figure 9 is used, whereas if a plurality of nozzles are carried by the movable head, then we prefer that a model aircraft having a plurality of balls in its structure be employed so that each ball will be properly supported in a jet separate from the other jet or jets. This means for supporting a spherical object in an upwardly directed jet is well known, being described in Patent No. 612,622, to Windrath, and Patent No. 137,119, to Withers. Consequently, we lay no claim to the broad principle of supporting an object in an upwardly directed jet of air, but rather to the adaptation of this well known principle to its use in connection with means identifying the supported body as an aircraft or model thereof.

Actual use of a device employing the principles of our present invention has demonstrated that a model aircraft can be supported very satisfactorily in this manner. By varying the force of the jet or jets, as by means of the throttle valve 71, the degree of elevation of the model above the map 28 can be altered, whereas if the force is permitted to remain constant and the nozzles held stationary, the model supported in the upwardly directed fluid will remain poised substantially stationary in mid-air. By manipulating the operating handle 82 properly, the nozzle bearing head 131 can be caused to move along, underneath and parallel to the slot 33, through which the jets are issuing. This will cause the model supported in the jets to advance correspondingly, thereby presenting the illusion of flight of the model aircraft from place to place. For example: It can be determined in advance, for the sake of competition, that a certain flight is to be made from the airport at the point indicated on the map as "Los Angeles" to the airport of another, distant city, also indicated on the map, as for example, "New York". The various competing players will take their turn and each will endeavor to cause his model aircraft to make the predetermined trip in a minimum of time, the person requiring the least time being the successful contestant.

By employing maps 28, which are accurately constructed so as to indicate truly the actual air routes being traveled by planes in regularly scheduled flight, valuable instruction can be imparted to the player or players, with respect to existing air lines; and inasmuch as the map 28 is removable, a plurality of such maps can be employed, each representing a different locality.

A considerable degree of skill is required to complete such a "flight" with efficiency, inasmuch as the nozzle-carrying head 131 must be moved carefully so as to keep its nozzles 122 and 123 so accurately under the slots 33 that the jets are not interfered with, and as soon as any such interference with the jets does occur, the model aircraft will "crack up", i. e., fall from its mid-air position onto the map 28, thus disqualifying the operator. This manipulation is rendered more difficult by the fact that the head must be turned whenever a corner is encountered, i. e., a line joining the nozzle 122 and 123 must at all times be substantially parallel to the slot being manuevered at any given time. It has been demonstrated, however, that even unskilled persons can maneuver an aircraft by the means hereinabove described, with sufficient efficiency to derive a great degree of entertainment and amusement therefrom.

Figures 10 to 13 inclusive, illustrate a modification of our invention, wherein a predetermined terrain 176 is represented upon the upper surface 177 of a suitable housing 178. In this surface 177 preferably a plurality of longitudinally extending slots 179 are provided, it being understood that the number of persons that can operate the device simultaneously corresponds to the number of slots 179. Associated with each slot 179 is a nozzle-carrying head 181 having one or more nozzles 182 mounted thereon, the present modification illustrating a single nozzle 182 for each head 181, with the result that the preferred type of model aircraft for use in conjunction with this modification of our invention, is the model balloon 101, illustrated upon Fig. 9. It should be borne in mind, however, that by duplicating the nozzles 182 on each head 181, a model aircraft having a plurality of balls in the structure thereof, can be employed with equal efficiency.

Any suitable means may be provided for supplying fluid to the nozzles 182. It is preferred, however, that individually controlling means be employed so as to enhance the competitive nature of this device. Figures 10 and 11 illustrate a mouth-blown system for each nozzle 182, each comprising a preferably flexible tube 183 leading to the nozzle 182 from a suitable mouthpiece 184, whereby each contestant is enabled to blow through his associated tube 183 and in that manner supply air to his nozzle 182, and by regulating the force with which he blows into the mouthpiece 189 determine the height at which a model balloon 181 is supported over the associated nozzle 182.

Means are provided for moving each of the several nozzle-carrying heads 181 longitudinally of the casing 178; and inasmuch as all of these mechanisms are preferably of identical construction, it will suffice for the purpose of the present disclosure to describe but one of them.

Each head 181 is mounted upon and carried by a suitable belt, cord or other flexible member 186, preferably endless and mounted upon opposed pulleys 187 and 188 at the after and forward ends 189 and 191, respectively, of the case 178. Each of these belts 186 is so positioned with respect to the associated slot 179 that the nozzle 182 carried thereby is adapted to direct its jet upwardly through that slot 179 and to support one of the model balloons 101, or other model aircraft as described hereinabove.

Means are provided for rotating one of the pulleys, preferably the pulley 188, so as to effect advance of the nozzle-carrying head 181 and the nozzle 182 carried thereby, and with them the model aircraft supported in the jet issued from the nozzle. Figures 12 and 13 illustrate in detail one type of mechanism adapted to perform this function. The pulley 188 is carried by a shaft 196 which also carries a worm wheel, which is engaged at all times with a driving-worm 197. This worm 197 is rigid with a shaft 198, one end of which extends through the forward wall 191 of the casing 178 to receive a hand wheel 199 or other suitable handle whereby the shaft can be rotated. The other end of the shaft 198 carries a gear 201 enmeshed with a smaller gear 202 which is carried by a countershaft 203 upon which a fly wheel 204 is rigidly secured. Because of the engagement between the large and small gears 201 and 202, respectively, the countershaft 203 and fly wheel 204 are driven by the drive shaft but at a faster rate, which tends to make the mechanism continue to drive the belt 186 under the inertia of the fly wheel 204 after cessation of application of power to the hand wheel 199. Means are provided for permitting the hand wheel 199 to turn the shaft 198 in a forward direction but for preventing the operator from stopping rotation of the shaft 198 suddenly. This engagement between the wheel 199 and the shaft 198 may be attained through the expedient of a steel ball 206 or its equivalent disposed in a recess 207 in the hub 208 of the wheel 199. The outer edge 209 of the recess 208 is of spiral form, wherein one end is farther from the axis of the shaft 198 than the other end. Hence, when the shaft 198 is stationary and the driving wheel 199 starts to rotate in a clockwise direction, as viewed upon Figure 13, the portions of the hub 208 defining the recess 207 will advance with respect to the ball 206 until the ball is seated in a portion of the recess 207 which is so narrow that binding occurs between the hub 208, ball 206, and shaft 198, whereupon continued rotation of the hand wheel 199 will effect similar rotation of the shaft wheel 198. However, upon cessation of the rotation of the hand wheel 199 the shaft 198 will "coast" through the influence of the inertia device 204, causing the nozzle 182 and the model aircraft supported in the jet thereof to continue to advance beyond the respective positions thereof at the time that the operator ceased to rotate the hand wheel 199. The purpose of this arrangement is to require more skill on the part of the operator. Defined upon the upper surface 177 of the case 178 is a "landing field" 211 at the end of each slot 179, upon which the operator endeavors to permit his model aircraft to come to rest; and in order to avoid "overshooting" the field and causing the model aircraft to drop outside the associated area 211 the operator must slow down rotation of his hand wheel 199 gradually, and at such a time that the danger of "overshooting" is avoided.

However, in order to facilitate return of the nozzle-carrying head 181 to starting position, means may be provided for fastening the hand wheel 199 positively to the shaft 198, such as a radially disposed pin 212 carried by the hub 208. This pin is slidable so that it is optionally receivable within or removable from a socket 213 in the shaft 198.

Other obstacles, hazards and the like over which the model balloons 101 must be flown, can be provided upon the upper surface 177 of the case 178. Preferably these hazards simulate those encountered by actual aircraft in flight. For example: Miniature replicas of a range of mountains 216, a power line 217, a fence 218, and a river 219 are illustrated upon Figures 10 and 11. Certain of the hazards can be rendered more dangerous for a given player by one of his opponents, as for example, a reproduction of a wind storm can be produced by manually collapsable bulbs 221 located at strategic points and adapted to direct "gusts" of air across the path of one or more of the aircraft.

Figures 14 and 15 illustrate means for exercising additional control over the movements over one of the model aircraft while supported in the jet or jets, as the case might be, of fluid as described hereinabove. These figures illustrate one of the nozzle-carrying heads 231 similar to the head 131 previously described, carrying auxiliary nozzles 232 and 233 in addition to the principal nozzles 234 and 236. The principal nozzles 234 and 236 are so positioned that the jets issuing therefrom are adapted to engage two balls, as the balls 112 and 113, and in that manner support the model aircraft. The auxiliary nozzles are arranged laterally with respect to one of the principal nozzles, preferably the nozzle 234 the jet from which engages the forward ball of the model aircraft. With the auxiliary nozzles 232 and 233 so arranged, the jets issuing therefrom are adapted to engage the wings 116 and 117 of the model airplane. Consequently, by providing means for controlling independently the two auxiliary nozzles 232 and 233, lateral tipping of the model aircraft can be produced, similar to the action of an actual aircraft, resulting from manipulation of its ailerons. Electromagnetic means are illustrated for performing this function. Carried by each of the nozzles over which control is to be maintained is a valve plate 237 slidable in a suitable housing 238, which is carried on one side of the nozzle. The valve plate 237 is adapted to enter the associated nozzle through a slot in a side of the nozzle so as to assume a position extending across the bore of the nozzle and thereby either reduce or shut off completely the flow of fluid therethrough.

Such movement of the plate 237 is effected through the expedient of a solenoid 244, the armature 239 of which is operably connected to the plate 237 in such a manner that when the solenoid 244 is energized, the plate 237 is drawn through the nozzle to effect the desired control over the flow of its fluid. A spring 240 is under compression between the armature 239 and a tubular housing 241 mounted on the other end of the solenoid 244, whereby return of the plate 237 to its opened position is effected upon de-energization of the solenoid.

Preferably such a control is provided upon the principal nozzles 234 and 236 as well as upon the auxiliary nozzles. By diminishing the flow through the forward principal nozzle 234, the model aircraft may be made to lower its nose, and by diminishing the flow through the after principal nozzle 236, the model aircraft may be made to lower its tail. Similarly, by diminishing or completely interrupting the flow through one of the auxiliary nozzles, the model airplane may be caused to lower the associated side thereof, simulating the effect produced in an actual aircraft by manipulation of its ailerons.

The respective solenoids associated with the nozzles 232, 233, 234, and 236 are indicated at 244, 247, 248, and 249. Means for energizing a selected one of the solenoids are provided and preferably this control switch is operated by means of a lever 251, the action of which is similar to that of the conventional control lever or "joy stick" commonly employed as the principal control of an airplane. This lever 251 which, due to limitations of the drawings, is illustrated on Fig. 13 merely in horizontal, transverse section carries a number of electrical contacts 252, 253, 254, and 256, which number coincides to the number of solenoids. All of these contacts 252 to 256 inclusive, are electrically connected as by a conductor 257 to one terminal of a source of electrical energy 258. The other terminal of the source of energy is connected to all of the solenoids 244, 247, 248, and 249 as by conductors 259, 261, 267, and 265 respectively. Associated with the contacts 252 to 256 inclusive, are contacts 262, 263, 264 and 266. By swinging the "joy stick" forwards, i. e., upwards as viewed upon Fig. 15, the contact 252 will engage the contact 262 which is connected as by conductor 267 to the solenoid 248, thereby completing the circuit of that solenoid and effecting its energization. In this manner the associated valve plate 237 will be moved toward closing position, diminishing the amount of flow through the nozzle 234, the jet from which supports the nose of the model aircraft. Consequently, by this movement of the lever 251, the nose of the model aircraft will be caused to dip.

The other fixed contacts 263, 264, and 266 are connected as by conductors 268, 269, and 271 to the solenoids 247, 249, and 244, respectively. Thus it may be seen that if the operator draws his "joy stick" toward him, the jet supporting the tail of his model aircraft will be diminished permitting the tail to drop, thereby producing substantially the same effect as that produced in an actual aircraft when the operator thereof pulls his "joy stick" toward himself. Similarly, movement of the lever 251 to the operator's left or right causes the corresponding side of the model aircraft which he is manipulating to be lowered, simulating the effect of "banking" the ship as by manipulation of its ailerons.

Thus it may be seen that an understanding of the fundamental principles of actual flight can be imparted to a beginner by means of an apparatus illustrated on Figures 14 and 15, because of the similarity between the control attained through the expedient of the lever 251 and the control exercised over an actual aircraft by means of its control stick or corresponding device.

Figure 16 illustrates a still further modification of our invention in the form of a tank 276 containing a suitable, preferably opaque fluid 277 in which a model boat 278 or the like appears to float. Actually, however, the boat 278 is carried at the outer end of a tubular arm 279 which extends radially from a vertical tube 281, the upper and lower ends of which are journaled in suitable bearings 282 and 283, respectively. The upper bearing 282 is carried on the under side of a structure 284 presenting the appearance of an island, whereas the lower journal 283 is carried by a platform 286 which is suspended below the bottom 287 of the tank 276. The tube 281, which extends through the bottom 287 of the tank and a suitable stuffing box 288, is adapted to be rotated through the expedient of suitable gearing 289, speed reduction box 291, and motor 292 which are mounted upon the platform 286. The island 284 is held stationary by means of a supporting tube 293 extending axially inside the rotary tube 281. This supporting tube 293 extends through the platform 286 to receive a conduit 294 whereby fluid can be supplied thereto, and suitable apertures 296 in the wall of the tube 293 permit this fluid to escape to the bore of the rotary tube 281 whence it can flow by way of the radial, tubular arm 279 to preferably a plurality of nozzles 297 and 298, whereby jets are directed upwardly from the boat 278. Each of these jets so provided is adapted to support a model aircraft, such as the model dirigible 301 and the model autogyro 302. By energization of the motor 292, the boat 278, and the nozzles 297 and 298 carried thereby are caused to rotate about the island 284; and by supplying fluid at suitable pressure to the hose 294, jets can be caused to issue from the rotating nozzles 297 and 298 thus permitting a plurality of model aircraft to be supported in mid-air over the boat 278 thereby presenting the appearance of a plurality of actual aircraft flying in formation. This device is very effective as a display device to attract the attention of passers by.

We claim:

1. In a pneumatically operated game, a frame comprising an operating surface, a map, means for disengageably supporting said map above and substantially parallel to said surface, said map having a multi-directional slot therein interconnecting predetermined localities on said map, means providing a pair of spaced nozzles below said map, means rotatably and movably supporting said nozzles upon said surface, means accessible at one side of said frame for turning said nozzles to aline them with a selected portion of said slot, means accessible at one side of said frame for moving said nozzles upon said surface and for controlling the direction of such movement, means for supplying fluid to said nozzles to produce jets issuing upwards therefrom, and a body simulating an aircraft in miniature adapted to be supported in said jets above said map when said nozzles are positioned to direct their jets through said slot and to be advanced over said map when said nozzles are moved along said slot.

2. In a device of the character described, a plurality of nozzles, means for supplying fluid to said nozzles and thereby producing jets issuing therefrom, a body simulating a miniature aircraft adapted to be supported in said jets with each jet impinging against a different portion of said body, and single means for controlling the force of said jets independently of each other whereby the position of said aircraft with respect to the horizontal can be varied.

3. A device of the character described, comprising means for directing a jet of fluid upwards, a body supported by said jet and comprising a stimulation in miniature of an aircraft, and means weighting a predetermined side of said body to add stability to the body while supported in said jet and retain it with that side down.

4. In a device of the character described, means providing an operating surface having an opening therein, a nozzle disposed below said surface and directing its jet upwards through said opening, means for supplying fluid under pressure to said nozzle to produce said jet, and a miniature aircraft disposed within said jet and supported thereby over the plane of said operating surface.

5. In a device of the character described, means providing an operating surface having an opening therein, a nozzle disposed below said surface and movable with respect thereto and directing its jet upwards through said opening, means for supplying fluid under pressure to said nozzle to produce said jet, and a body disposed within said jet and supported thereby over the plane of said operating surface, said nozzle being movable with respect to said surface and said opening being larger than the cross sectional area of said jet at the plane of said surface, whereby said supported body can be caused to move about above the plane of said surface while supported by said jet.

6. In a device of the character described, means providing an operating surface having an opening therein, a plurality of nozzles disposed in predetermined relative arrangement below said surface and directing their jets upwards through said opening, means for supplying fluid under pressure to said nozzles to produce said jets, and a miniature aircraft supported by said jets over the plane of said operating surface and having separate means engaged by each of said jets to retain said miniature aircraft with an axis thereof extending in a relatively fixed direction with respect to said arrangement of said nozzles.

7. In a device of the character described, means providing an operating surface having an opening therein, a plurality of nozzles disposed in predetermined relative arrangement below said surface and directing their jets upwards through said opening, means for supplying fluid under pressure to said nozzles to produce said jets, and a miniature aircraft supported by said jets over the plane of said operating surface and having separate means engaged by each of said jets to retain said miniature aircraft with an axis thereof extending in a relatively fixed direction with respect to said arrangement of said nozzles.

8. In a device of the character described, means providing an operating surface having an opening therein, a plurality of nozzles disposed in predetermined relative arrangement below said surface and directing their jets upwards through said opening, means for supplying fluid under pressure to said nozzles to produce said jets, a miniature aircraft supported by said jets over the plane of said operating surface and having separate means engaged by each of said jets to retain said body with an axis thereof extending in a relatively fixed direction with respect to said arrangement of said nozzles, and said nozzles being rotatable as a group whereby said miniature aircraft can be caused to turn about a vertical axis and to point in any selected direction with respect to said operating surface while supported in said jets.

9. In a device of the character described, a plurality of nozzles, means for supplying fluid to said nozzles to produce jets issuing therefrom, movable means supporting said nozzles and retaining them with their jets in predetermined arrangement with respect to each other, a miniature aircraft comprising a body associated with each of said jets and adapted to be supported thereby and means interconnecting said bodies, means for advancing said nozzle-supporting means and thereby advancing said aircraft accordingly, and means for rotating said nozzle-supporting means about a vertical axis and thereby rotating said aircraft accordingly.

10. In a device of the character described, a plurality of movably mounted nozzles, means for supplying fluid to said nozzles to produce jets issuing therefrom, a miniature aircraft supported by said jets, means for moving said nozzles to advance said aircraft in translatory movement, and means for moving said nozzles to exercise control over the direction in which said aircraft points.

11. In a device of the character described, a plurality of movably mounted nozzles, means for supplying fluid to said nozzles to produce jets issuing therefrom, a miniature aircraft supported by said jets, and means for moving said nozzles to exercise control over the direction in which said aircraft points without advancing it in a horizontal direction.

12. In a device of the character described, a plurality of movably mounted nozzles, means for supplying fluid to said nozzles to produce jets issuing therefrom, a miniature aircraft supported by said jets, and control means for varying the direction in which said aircraft points independently of any translatory movement thereof.

13. In a device of the character described, a plurality of movably mounted nozzles, means for supplying fluid to said nozzles to produce jets issuing therefrom, a miniature aircraft supported by said jets, and means for varying the intensity of one of said jets independently of the other to vary the inclination of said aircraft with respect to the horizontal.

14. In a device of the character described, a plurality of nozzles, means for supplying fluid to said nozzles to produce jets issuing therefrom, movable means supporting said nozzles and retaining them with their jets in predetermined arrangement with respect to each other, means for moving said nozzles to advance said aircraft in translatory movement, means for moving said nozzles to exercise control over the direction in which said aircraft points, and means for varying independently the intensity of one of said jets to vary the inclination of said aircraft with respect to the horizontal.

15. In a device of the character described, a miniature aircraft, means providing fluid jets by which said aircraft is supported, said means being movable in translatory movement and in rotary movement independent of any translatory movement to effect corresponding movement of said aircraft.

16. In a device of the character described, a miniature aircraft and means providing fluid jets by which said aircraft is supported, said means being rotatable to effect corresponding movement of said aircraft.

17. In a game of the character described, a map having a slot therein interconnecting predetermined localities on said map, supporting means movably mounted below said map, a nozzle carried by said supporting means and pointing upwards through said slot, means for supplying fluid to said nozzle to produce a jet issuing therefrom, a miniature aircraft adapted to be supported by said jet above said map, and means for advancing said support along said slot to cause said aircraft to move correspondingly above said map.

18. In a game of the character described, a map having a slot therein interconnecting predetermined localities on said map, supporting means movably mounted below said map, a plurality of spaced nozzles carried by said supporting means and pointing upwards through said slot, means for supplying fluid to said nozzles to produce jets issuing therefrom, a miniature aircraft adapted to be supported by said jets above said map, and means for rotating said support about a vertical axis to cause said aircraft to move correspondingly above said map.

19. In a game of the character described, a map having a slot therein interconnecting predetermined localities on said map, supporting means movably mounted below said map, a plurality of spaced nozzles carried by said supporting means and pointing upwards through said slot, means for supplying fluid to said nozzles to produce jets issuing therefrom, a miniature aircraft adapted to be supported by said jets above said map, means for advancing said support along said slot to cause said aircraft to move correspondingly above said map, and means for rotating said support about a vertical axis to cause said aircraft to move correspondingly above said map.

MINNIE L. BURKE.
RICHARD J. BURKE.

CERTIFICATE OF CORRECTION.

Patent No. 2,128,690. August 30, 1938.

MINNIE L. BURKE, ET AL.

It is hereby certified that error appears in the printed specification of the above numbered patent requiring correction as follows: Page 7, second column, line 11, claim 3, for the word "stimulation" read simulation; and that the said Letters Patent should be read with this correction therein that the same may conform to the record of the case in the Patent Office.

Signed and sealed this 27th day of December, A. D. 1938.

(Seal)

Henry Van Arsdale
Acting Commissioner of Patents.